US012798541B2

(12) United States Patent
Dreyer et al.

(10) Patent No.: US 12,798,541 B2
(45) Date of Patent: Nov. 17, 2026

(54) PNEUMATIC VALVE WITH VENTING GUIDE AND TILT PROTECTION

(71) Applicant: ZF CV Systems Europe BV, Brussels (BE)

(72) Inventors: Werner Dreyer, Garbsen (DE); Kabilan Rengasamy, Chennai (IN); Krzysztof Adamski, Wroclaw (PL)

(73) Assignee: ZF CV Systems Europe BV, Brussels (BE)

(*) Notice: Subject to any disclaimer, the term of this patent is extended or adjusted under 35 U.S.C. 154(b) by 378 days.

(21) Appl. No.: 18/529,153

(22) Filed: Dec. 5, 2023

(65) Prior Publication Data

US 2024/0181841 A1 Jun. 6, 2024

(30) Foreign Application Priority Data

Dec. 6, 2022 (EP) .................................... 22211576

(51) Int. Cl.

| | |
|---|---|
| ***B60T 15/04*** | (2006.01) |
| ***B60T 15/02*** | (2006.01) |
| ***B60T 15/24*** | (2006.01) |
| ***B60T 15/54*** | (2006.01) |
| ***B60T 17/04*** | (2006.01) |
| ***B60T 17/08*** | (2006.01) |
| *B60T 13/38* | (2006.01) |

(52) U.S. Cl.

CPC .......... *B60T 15/043* (2013.01); *B60T 15/027* (2013.01); *B60T 15/04* (2013.01); *B60T 15/041* (2013.01); *B60T 15/243* (2013.01); *B60T 15/54* (2013.01); *B60T 17/04* (2013.01); *B60T 17/088* (2013.01); *B60T 13/385* (2013.01)

(58) Field of Classification Search

CPC ...... B60T 15/027; B60T 15/04; B60T 15/041; B60T 15/243; B60T 15/54; B60T 15/043; B60T 15/045; B60T 15/046; B60T 17/04; B60T 17/088; B60T 13/385

USPC ............................................................ 303/52

See application file for complete search history.

(56) References Cited

U.S. PATENT DOCUMENTS

| | | | | |
|---|---|---|---|---|
| 4,822,110 A * | 4/1989 | Angelillo | .............. B60T 15/046 303/56 | |
| 2024/0181841 A1* | 6/2024 | Dreyer | .................. B60T 15/041 | |

FOREIGN PATENT DOCUMENTS

| | | | |
|---|---|---|---|
| DE | 3439086 A1 * | 5/1986 | ............ B60T 15/046 |
| DE | 2817991 C2 * | 11/1987 | ............ B60T 15/046 |
| DE | 3810968 A1 * | 10/1989 | ............ B60T 15/046 |
| DE | 102014011423 A1 | 2/2016 | |
| DE | 102015016658 A1 | 6/2017 | |

(Continued)

*Primary Examiner* — Thomas J Williams

(74) *Attorney, Agent, or Firm* — Dickinson Wright PLLC

(57) ABSTRACT

A pneumatic valve (1) includes a housing (6), a supply connection (8), a working connection (10) for providing working pressure (pB), an exhaust portion (12) for discharging pressurized air, an attachment portion (74), a valve member (24) and a venting guide (4). The venting guide (4) has a venting channel (108) and complementary connection elements (76) engaging the attachment portion (74), a spout (78), and a support projection (100). The support projection (100) is positioned adjacent to a contact region (102) of the housing (6) and configured to abut the contact region (102) to block tilting of the venting guide (4) relative to the housing (6). A vehicle (300) includes a brake system (200) having the pneumatic valve (1).

20 Claims, 8 Drawing Sheets

(56) References Cited

FOREIGN PATENT DOCUMENTS

| | | | | | |
|---|---|---|---|---|---|
| DE | 102019119808 | A1 | | 1/2021 | |
| EP | 0197678 | A1 | * | 10/1986 | ............ B60T 15/046 |
| EP | 0241436 | A1 | * | 10/1987 | ............ B60T 15/046 |
| EP | 0151988 | B1 | * | 11/1987 | ............ B60T 15/046 |
| EP | 0589185 | A1 | * | 3/1994 | ............ B60T 15/045 |
| EP | 2266854 | A2 | | 12/2010 | |
| EP | 3611065 | A1 | | 2/2020 | |
| EP | 3626564 | A1 | | 3/2020 | |
| GB | 2153466 | A | * | 8/1985 | ............ B60T 15/046 |
| GB | 2193547 | A | * | 2/1988 | ............ B60T 15/046 |
| WO | 2021074663 | A1 | | 4/2021 | |

* cited by examiner

PNEUMATIC VALVE WITH VENTING GUIDE AND TILT PROTECTION

FIELD

The present disclosure relates to a pneumatic valve for providing a working pressure, including a housing having a first housing side, a supply connection for receiving a supply pressure, a working connection for providing the working pressure, an exhaust portion for discharging pressurized air from the pneumatic valve located proximate to the first housing side, an attachment portion, a valve member continuously slidable from an exhaust position to a fully open position, and a venting guide, the venting guide including a venting channel and complementary connection elements engaging the attachment portion. The working connection is in fluid communication with the exhaust portion when the valve member is in the exhaust position, and the working connection is in fluid communication with the supply connection and sealed from the exhaust portion when the valve member is in an at least partially open position.

BACKGROUND

Pneumatic valves of the aforementioned type are widely used in the vehicle industry. In particular, pneumatic valves of the aforementioned type are used as brake valves providing braking pressure for brake mechanisms. Commercial vehicles, in particular busses, cargo vehicles such as trucks, and other heavy duty vehicles are to be understood as using these pneumatic valves. The pneumatic valves receive pressurized fluid from a pressure source and provide pressurized fluid at a working pressure to a vehicle system or actuator, such as a brake actuator, brake caliper of a disk brake, or a drum brake or the like. By sliding the valve member to the open position, pressurized air provided to the supply connection at the supply pressure is transmitted to the working connection at a working pressure that corresponds to the position of the valve member between the exhaust position and the open position. When the valve member is in the exhaust position, the working connection is vented and no fluid at working pressure is supplied. When the valve member is in the fully open position a working pressure substantially equal to the supply pressure will be supplied to the actuator. The valve member is movable between the exhaust position and the fully open position by an operator of the vehicle or based on electronic signals. For example, the valve member may be biased in the exhaust position and is movable from the exhaust position via a foot brake pedal attached to the valve member. When a user pushes the brake pedal, the valve member is moved. As soon as the user releases the brake pedal, the valve member returns to the exhaust position.

Conventional pneumatic valves include an exhaust silencer that reduces noise when an actuator or system connected to the pneumatic valve is vented via the pneumatic valve. Due to various reasons, for example to allow for foot actuation of a pneumatic valve functioning as a brake valve, pneumatic valves are often installed close to a base of the vehicle (e.g. close to a cabin floor of the vehicle). However, a maximum fording depth of the vehicle is thereby limited. If a water level rises to the exhaust silencer while the vehicle drives through a stream or puddle, water ingresses into the brake valve and adversely affects the pneumatic valve. Therefore, fording versions of pneumatic valves have been developed. Instead of an exhaust silencer, the exhaust portion of such pneumatic valves is connected to a venting guide, which is then connected to an exhaust located at the top of the vehicle via a hose or pipe. It is further desirable to locate the exhaust outside of the vehicle cabin in order to reduce a noise for passengers of the vehicle. However, fording versions of pneumatic valves are prone to damage. During operation and/or assembly of the pneumatic valve, forces may be exerted on the venting guide that can result in the pneumatic valve being damaged. For example, the venting guide may be broken off the pneumatic valve, if excessive forces are exerted on the venting guide.

SUMMARY

It is therefore an object of the present disclosure to provide a pneumatic valve having increased resistance to damage.

The present disclosure solves the above mentioned problem with a pneumatic valve according to the present disclosure, in particular with a pneumatic valve of the aforementioned type, wherein the venting guide includes a spout and a support projection, wherein the support projection is positioned adjacent to a contact region of the housing provided on the first housing side and configured to abut the contact region to prevent tilting of the venting guide relative to the housing. The inventors have found that most damages to pneumatic valves of the aforementioned type result from excessive forces on a spout of the venting guide. These forces are provided on the spout during assembly and/or during operation, for example by a hose connecting the venting guide to a high spot of a vehicle. In particular, vibrations of the hose may exert eccentric forces to the spout during operation of the vehicle. The forces provided on the spout lead to tilting of the venting guide relative to the engagement portion. Once the relative movement or tilt of the venting guide with respect to the engagement portion is too large, the connection elements may be damaged. Such damages to the connection elements may also result from continuous or alternating loads provided thereon which may lead to fatigue fractures or the like. Moreover, tilting of the venting guide can result in leakages and/or allow water ingress into the pneumatic valve.

The solution found by the inventors is that tilting of the venting guide can be prevented by a support projection. The support projection preferably extends from a main venting guide body of the venting guide opposite the spout. However, the venting guide preferably is a one-piece construction. The support projection is positioned adjacent to a contact region of the housing, which is provided on the first housing side. The contact region is located proximate to the exhaust portion such that positioning of the support projection adjacent to the contact region is facilitated. The contact region preferably is a flat surface of the housing. The support projection preferably contacts the contact region when the complementary connection elements engage the attachment portion. Tilting of the venting guide relative to the housing is blocked by the support projection of the venting guide. It shall be understood that the support projection does not inhibit all movement of the venting guide relative to the housing. The support projection rather limits excessive loads on the venting guide resulting from large deformations (excessive tilting). The support projection may allow for a slight tilt of the venting guide relative to the housing out of its neutral position. Such a slight tilt may be a tilt of less than 10°, preferably less than 5°, preferably less than 3°. The venting guide blocks tilting relative to the housing, which may otherwise lead to damages during assembly or operation. In order to limit excessive tilting of the venting guide relative to the housing, the support projection abuts the contact region such that forces provided on the venting guide, in particular on the spout of the venting guide, are transferred to the housing. The forces then need not be transferred by the complementary connection elements connecting the venting guide to the attachment portion. Damages to the complementary connection elements as well as leaks at the connection between the venting guide and the attachment portion are therefore limited. Naturally, extreme forces may still damage the venting guide. Preferably, the support projection is a lug. Disturbances of the attachment portion and any elements of the pneumatic valve connected thereto are reduced or prevented, because such disturbances may be transferred from the venting guide to the contact region instead of the attachment portion. Preferably, the venting guide includes multiple support projections.

The support projection preferably includes a support surface corresponding to a first contact surface of the contact region. For example and preferably, the support surface and the first contact surface may be flat surfaces. The support surface may also be a convex surface while the first contact surface is a corresponding concave surface or vice versa. Preferably, the support surface and/or the first contact surface are machined surfaces (i.e. no rough cast surfaces).

The spout is configured for connecting a hose or pipe thereto. The term spout does not imply a specific form. Preferably, the spout has the form of a cylindrical, rectangular, or conical pipe. The spout may comprise elements that facilitate securing of a hose or pipe. Preferably, the spout may comprise a zigzag or saw tooth shaped outer surface or may comprise one or more projections on its outer surface.

The venting guide is configured to discharge pressurized air received from the brake valve to the environment. The attachment portion is preferably formed on or part of the exhaust portion. During operation and when the working connection of the pneumatic valve is vented, air passes from the working connection to the exhaust portion of the pneumatic valve. At the exhaust portion the air passes to the venting guide which then discharges the pressurized air from the pneumatic valve, for example via a hose or pipe attached to the spout. For example, the venting guide may be connected to a hose that transfers the pressurized air to an exhaust silencer spaced apart from the pneumatic valve when the pneumatic valve is installed in a vehicle. Preferably, the pneumatic valve is a brake valve and/or part of a brake system. Particularly preferred, the pneumatic valve is a brake valve suited for providing a brake pressure to a pneumatic vehicle brake system of a commercial vehicle.

The attachment portion preferably includes connection elements. The connection elements of the venting guide and the connection elements of the attachment portion are preferably formed compatible to each other. The connection elements and/or the complementary connection elements may comprise slots for receiving hooks, one or more threaded portions, one or more hooks, and/or one or more protrusions. Preferably, the connection elements and the complementary connection elements each form a respective bayonet connector half. It shall be understood that the connection elements and/or the complementary connections elements may also be formed by one element, only. For example, a single threaded portion may form the connection elements.

According to a first preferred embodiment, the spout is an essentially L-shaped spout having a first leg and a second leg. The second leg is proximate to the exhaust portion while the first leg extends from the second leg at a leg angle. The first leg is configured for attaching a further element such as a hose or pipe. The leg angle preferably lies in a range of 60° to 150°, preferably 70° to 130°, preferably 70° to 120°, preferably 70° to 110°, preferably 80° to 100°, particularly preferred in a range of 85° to 95°. An L-shaped spout therefore does not necessarily comprise a 90° leg angle. Pneumatic valves usually have an elongate shape with the exhaust portion located at first housing side transverse to a longitudinal axis. A straight type spout having a leg angle of 180° would extend far from the housing and would further increase the length of the pneumatic valve. An L-shaped spout allows for a compact design of the pneumatic valve, because a hose or pipe may be laterally connected to the pneumatic valve. The L-shaped spout therefore facilitates assembly and/or integration of the pneumatic valve into a vehicle. Preferably, the complementary connection elements are formed on the second leg of the spout. The first leg preferably has a first leg length greater that a corresponding second leg length of the second leg. Preferably, the first leg length is twice as large as the second leg length or larger. Particularly preferred the leg length is in relation to a housing size of the housing.

In a further preferred embodiment, the support projection extends opposite the first leg of the L-shaped spout. The second leg and/or the complementary connection elements are preferably located between the first leg and the support projection in a first direction. The first direction is preferably parallel to the first contact surface of the housing. A support projection extending opposite of the first leg is particularly suited for supporting loads provided on the first leg, because leverage of the support projection is maximized. Forces provided on the first leg, for example by a hose or pipe connected thereto, are effectively transferred to the contact region of the housing. Opposite in this context means that the first leg and the support projection are arranged on opposite sides of the venting guide. Preferably, the first leg and the support projection enclose an angle in a range of 145° to 225°, preferably 160° to 200°, preferably 175° to 185°, particularly preferred 180°.

Preferably, the venting guide includes a venting channel having a first venting channel portion extending in the first leg and a second venting channel portion extending in the second leg of the L-shaped spout, wherein a tapered end portion of the first venting channel portion extends beyond an intersection between the first venting channel portion and the second venting channel portion. The venting channel directs pressurized fluid from the exhaust portion to a further discharge element (e.g. hose or pipe) connected to the spout. Preferably, the first venting channel portion and the second venting channel portions are straight channels. Preferably, the tapered end portion has a conical shape, particularly preferred a circle cone shape. A cone formed by the conical shape preferably has an opening angle in a range of 70° to 150°, preferably 80° to 140°, preferably 90° to 140°, preferably 100° to 130°, preferably 110° to 130°, particularly preferred 115° to 125°. During operation, pressurized air is discharged from the pneumatic valve to the environment or another element via the venting channel. The air exerts forces on the venting guide, in particular at the intersection between the first venting channel portion and the second venting channel portion, because a flow direction of the air changes at the intersection. Moreover, a pressure gradient between the pneumatic valve and the environment may result in further loads or forces. The tapered end portion evenly distributes those forces. The tapered end portion may thus reduce a moment acting on the venting guide due to pressure in the venting channel. The venting channel may also have a first venting channel portion and a second venting channel portion without having a tapered end portion. For example, the first venting channel portion and the second venting channel portion may be connected by a bend and/or a corner. Preferably, a first internal cross section of the first venting channel portion is identical to a second internal cross section of the second venting channel portion.

The attachment portion and the complementary connection elements preferably allow rotation of the venting guide around a rotational axis when engaging each other. According to this embodiment, the complementary connection elements and the attachment portion allow movement around the rotational axis while the venting guide is fixed along the rotational axis. The complementary connection elements, the attachment portion and/or connection elements of the attachment portion may be formed rotationally symmetrical and/or point symmetrical. Preferably, the complementary connection elements are formed as hooks engaging a corresponding rim or groove of the attachment portion. The hooks may then slide in the groove or on the rim when the venting guide rotates around the rotational axis. The complementary connection elements and attachment portion allow rotation of the venting guide around a rotational axis which enables use of a single design of the pneumatic valve in multiple applications. This has a positive effect of cost associated to the pneumatic valve. For example, manufacturing cost of the pneumatic valve may be decreased. The rotational axis is preferably parallel, particularly preferred congruent, with a longitudinal axis of the pneumatic valve and/or of the housing. Preferably, the rotational axis is a central axis of the housing. The first direction preferably extends transverse to the rotational axis and/or the central axis.

In a further preferred embodiment, the venting guide engages a corresponding slot to block rotation of the venting guide around the rotational axis. As described above, forming the complementary connection elements and the attachment portion such that the venting guide is rotatable around a rotational axis allows for use of a single valve design for multiple applications. For example, the valve may be used in an application (e.g. in a first vehicle model) in that the spout is directed to a second side to the housing as well as another application (e.g. an alternative second vehicle model) that requires that the spout is directed to a third side of the housing opposite the second side. However, in certain applications a rotatable venting guide may not be desirable. This may be the case if a flexible hose is connected to the spout instead of a stiff pipe. Such a hose may twist when the venting guide rotates such that a flow passage inside the hose is blocked. The venting guide engaging the slot limits rotation of the venting guide. This anti-rotation feature provided by the slot and the venting guide is formed separately of the complementary connection elements and the attachment portion. A slot is simple to manufacture such that the pneumatic valve may be easily adapted to specific applications. Preferably, the slot is formed in an external surface of the pneumatic valve. Preferably, the slot is formed in the housing. This allows for a stable anti-rotation feature provided by the protrusion and the slot, because the housing is already configured to receive loads. Preferably, the slot is formed in the first contact surface of the contact region of the housing. A housing configured for use in multiple applications may then be adapted to a specific application requiring a specific orientation of the spout with regard to the housing by machining the slot at a predefined location of the housing. Preferably, the slot is formed in an adapter connected to the housing. Preferably, the slot is exclusively formed in the adapter. The adapter is fixed to the housing in a rotation free manner. That is, the adapter may not rotate around the rotational axis relative to the housing. With the help of the adapter, a housing that can be used for various applications can be adapted for an application requiring a specific orientation of the spout with regard to the housing. The adapter is preferably formed from a plastic material and/or metal. Preferably, the adapter is snap fitted, welded, screwed and/or glued to the housing. Use of an adapter allows for an economic adaption of the pneumatic valve to a specific application.

Preferably, a protrusion of the venting guide extends from the support projection towards the contact region. Preferably, the protrusion extends transverse to the first contact surface of the contact region of the housing and/or transverse to the support surface of the support projection.

In a preferred further development, the protrusion of the venting guide engages the slot. The protrusion then is an element at least partially dedicated to engaging the slot to prevent rotation of the venting guide. By forming the protrusion such that it extends from the support projection, the support projection and the protrusion prevent tilting as well as rotation.

Preferably, the contact region of the housing comprises a first contact surface and a second contact surface transverse to the contact surface, wherein the support projection is positioned adjacent to the first contact surface and configured to abut the first contact surface to prevent tilting of the venting guide relative to the housing in a first tilt direction, and wherein the protrusion is positioned adjacent to the second contact surface and configured to abut the second contact surface to prevent tilting of the venting guide relative to the housing in a second tilt direction opposite the first tilt direction. The support projection and its protrusion then prevent tilting of the venting guide in two opposing directions. For example, the support projection may contact the first contact surface to prevent tilting of the venting guide relative to the housing in a clockwise direction while the support projection abutting the second contact surface may prevent tilting of the venting guide relative to the housing in a counter-clockwise direction. The second contact surface preferably is a circumferential surface of the housing, particularly preferred an inner circumferential surface of the housing.

According to a preferred embodiment, the pneumatic valve further comprises a guide element, wherein the valve member is slidably arranged on the guide element, the guide element comprising an internal channel, wherein the internal channel forms part of an exhaust flow path between the working connection and the exhaust portion when the valve member is in the exhaust position.

Preferably, the venting guide is formed separately from the guide element and the attachment portion is formed on the guide element. The venting guide is then attached to the guide element by the complementary connection elements engaging the attachment portion.

Preferably, the pneumatic valve further comprises a valve sealing member provided at a transition between the internal channel and the venting channel for establishing a sealing connection between the venting guide and the guide element. Leaks of pressurized air from the exhaust flow channel are also limited. Preferably, the venting guide is sealingly connected to the internal channel of the guide element. Preferably, a valve sealing surface is provided on the guide element. The valve sealing member may be provided at the connection between the venting guide and the guide element. The guide element includes a sliding surface on which the valve member is slidably arranged. This sliding surface is precise. The guide element is preferably machined and/or molded or injection-molded. Preferably, the guide element is made from plastic material. During manufacturing and/or molding of the precise sliding surface, the attachment portion and preferably also the valve sealing surface may be formed at a high precision with little additional effort. Manufacturing time and cost of the brake valve as a whole can be reduced. Moreover, a spatial relation of the internal channel, the connection elements and/or the valve sealing surface is ensured which substantially limits assembly errors. In other embodiments, the guide element is preferably formed by additive manufacturing (3D-printing).

In a preferred embodiment, the venting guide is snap fitted to the attachment portion. Preferably, the snap fit is releasable. A releasable snap fit may be disengaged without destroying a connection element. The snap fit may also be inseparable, such that the venting guide may only be disengaged from the attachment portion by braking a corresponding connection element and/or a connection element of the attachment portion. A snap fit is an assembly method used to attach (partially) flexible parts to form the final product by pushing interlocking components together. The snap fit may be a cantilever, torsional and/or annular type snap fit. The snap fit facilitates assembly and requires no loose parts such as circular springs.

In a preferred embodiment, the venting guide includes one or more reinforcement ribs extending from the support projection towards a main venting guide body of the venting guide. The second leg of the spout may be formed by the main body. The complementary connection elements are preferably formed on the main body or preferably extend therefrom. The reinforcement ribs preferably extend at a rib angle in a range of 70° to 10°, preferably 15° to 60°, preferably 20° to 50°, from the support projection. By providing reinforcement ribs, deformation of the support projection is effectively prevented without requiring a thick support projection. The reinforcement ribs are particularly useful for strengthening the support projection, when the protrusion engaging the slot extends from the support projection. Rotational forces provided on the venting guide may be transferred to the housing via the protrusion while the reinforcement ribs substantially limit bending of the support projection. However, it shall be noted that the reinforcement ribs are not essential to a support projection including a protrusion engaging a slot.

Preferably, a gap is formed between the contact region and the support projection when the venting guide is in a neutral position. The gap allows for facilitated assembly and manufacturing of the pneumatic valve, because the individual subparts of the pneumatic valve may be manufactured with less precision. The venting guide tilts slightly when a tilting force is applied to the venting guide such that the gap between the support projection and the contact region is closed in a loaded position. The venting guide is in its neutral position, when no external forces are applied to the venting guide. It shall be understood, that the gap is a small free space between two regions or surfaces configured to be brought into contact with each other (the contact region and the support projection). A gap is a small space having a gap width that allows compensation of manufacturing tolerances. The gap preferably has a gap width in a range of larger than 0 mm to 2 mm, preferably 0 mm to 1.5 mm, preferably 0 mm to 1.25 mm, preferably 0 mm to 1 mm, particularly preferred 0 mm to 0.5 mm, when the venting guide is in the neutral position. Preferably, the support surface and the first contact surface are parallel when the venting guide is in the neutral position.

Preferably, the contact region forms an end stop for the venting guide preventing excessive loads on the attachment portion when the venting guide is assembled on the attachment portion. In particular, when the venting guide is attached to the attachment portion via a snap fit, assembly forces need to be provided on the venting guide during its assembly on the attachment portion. The end stop may prevent overloading the attachment portion, because excessive assembly loads may be transferred from the support projection to the housing.

According to a second aspect of the present disclosure, the above stated problem is solved by a vehicle including a brake system having a pneumatic valve according to the first aspect of the present disclosure. The vehicle preferably is a commercial vehicle. The brake system preferably is a pneumatic brake system. In a particularly preferred embodiment, the pneumatic valve is a brake signal transmitter and/or a foot brake valve of the brake system. The brake system may comprises one or more brake circuits, one or more brake actuators, one or more pressurized air supplies and/or one or more brake modulators. The vehicle preferably comprises at least two axles.

It should be understood that the pneumatic valve according to the first aspect of the present disclosure and the vehicle according to the second aspect of the present disclosure preferably have similar or equal aspects, in particular as they are described in the present disclosure and claims. Thus, reference is made to the above description of the pneumatic valve according to the first aspect of the present disclosure.

For a more complete understanding of the present disclosure, the present disclosure will now be described in detail with reference to the accompanying drawings. The detailed description will illustrate and describe what is considered as preferred embodiments of the present disclosure. It should of course be understood that various modifications and changes in form or detail could readily be made without departing from the spirit of the present disclosure. It is therefore intended that the present disclosure may not be limited to the exact form and detail shown and described herein, nor to anything less than the whole of the present disclosure disclosed herein and as claimed herein after. Further, the features described in the description, the drawings and the claims disclosing the present disclosure may be essential for the present disclosure considered alone or in combination. In particular, any reference signs in the claims shall not be construed as limiting the scope of the present disclosure. The wording "comprising" or "including" does not exclude other elements or steps. The word "a" or "an" does not exclude the plurality. The wording "a number of" items comprising also the number 1, i.e. a single item, and further numbers like 2, 3, 4 and so forth.

DETAILED DESCRIPTION

Figure 1:
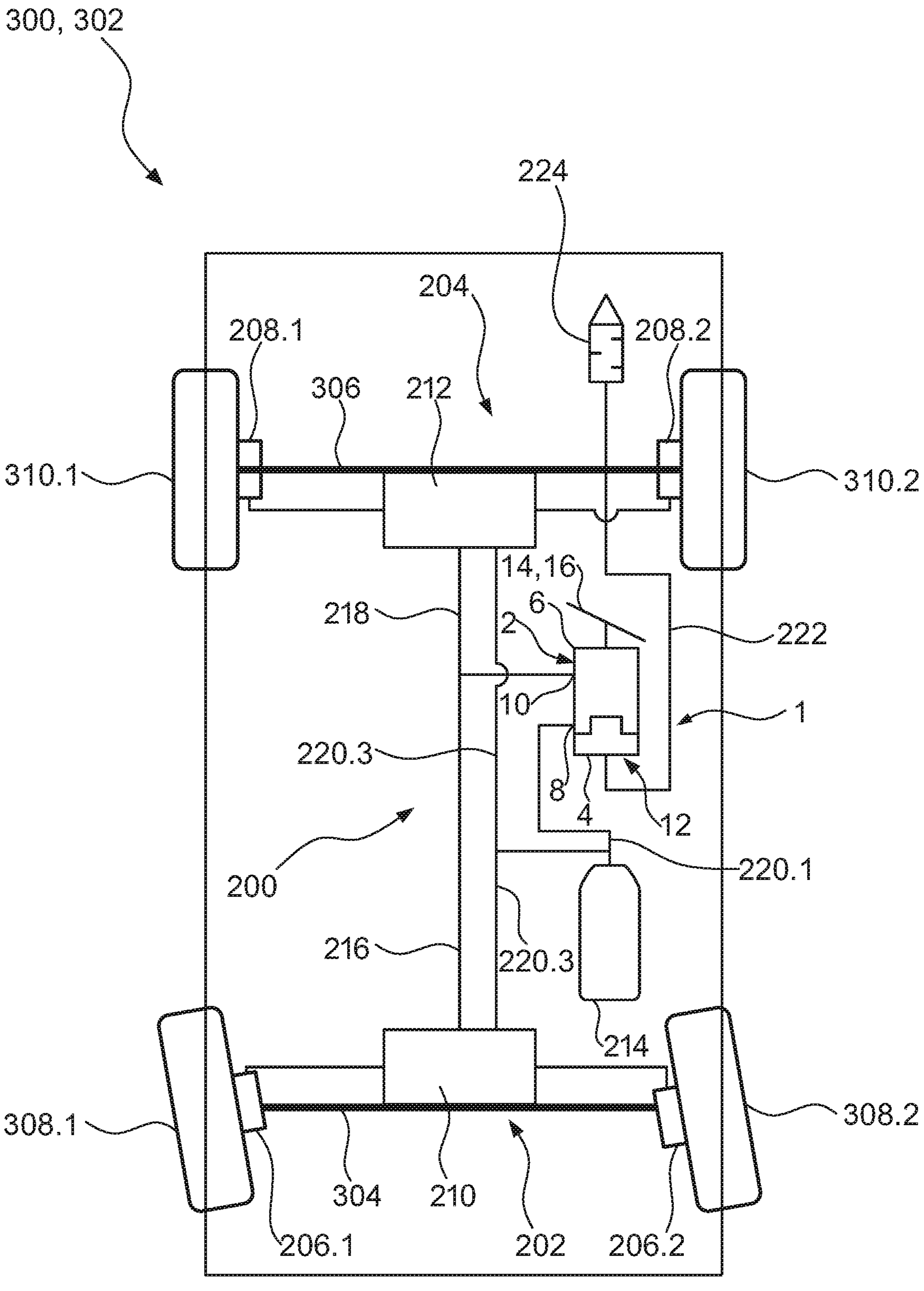
FIG. 1 is a schematic layout of a vehicle having a pneumatic valve, wherein the pneumatic valves forms a brake valve of a brake system in a fording version of the vehicle.

A vehicle 300, in particular a commercial vehicle 302, includes a front axle 304 and a rear axle 306. For braking front wheels 308.1, 308.2 of the front axle 304 and rear wheels 310.1, 310.2 of the rear axle 306, the vehicle 300 includes a brake system 200 having a front axle brake circuit 202 for braking the front wheels 308.1, 308.2 and a rear axle brake circuit 204 for braking the rear wheels 310.1, 310.2. For braking the wheels 308.1, 308.2, 310.1, 310.2, the brake system 200 includes front axle brake actuators 206.1, 206.2 and rear axle brake actuators 208.1, 208.2. The front axle brake actuators 206.1, 206.2 are connected to a front axle brake modulator 210 while the rear axle brake actuators 208.1, 208.2 are connected to a rear axle brake modulator 212. For providing compressed air at a supply pressure pS, the brake system 200 includes a compressed air supply 214. Of course, it may comprise more than one air supply.

In order to brake the vehicle 300 a brake pressure pB needs to be supplied to the front axle brake modulator 210 and the rear axle brake modulator 212. For providing the brake pressure pB, the brake system 200 includes a brake valve 2. In this embodiment, a pneumatic valve 1 forms the brake valve 2. The pneumatic valve 1 includes a housing 6, having a supply connection 8, a working connection 10, and an exhaust portion 12. The supply connection 8 is connected to the compressed air supply 214 via supply line 220.1 for receiving pressurized air at the supply pressure pS.

In this embodiment the pneumatic valve 1 is configured for manual actuation by a user. However, the pneumatic valve 1 may also be formed as an electronically actuated pneumatic valve 1. Upon actuation by a user the pneumatic valve 1 forming the brake valve 2 provides a brake pressure pB corresponding to the degree of actuation provided by the user. To allow an actuation, the pneumatic valve 1 includes an actuation element 14, which is formed as a brake pedal 16 in this embodiment. The brake valve 2 is configured to modulate the brake pressure pB supplied to the working connection 10 dependent on a degree of actuation of the actuation element 14. If the brake pedal 16 is only slightly actuated, a low brake pressure pB is supplied to the working connection 10 while a high brake pressure pB is supplied to the working connection 10 when the brake pedal 16 is fully actuated.

The pneumatic valve 1 is connected to the front axle brake modulator 210 and the rear axle brake modulator 214 via connecting lines 216, 218. In this embodiment, the pneumatic valves 1 is formed as a single circuit brake valve 2 having only one working connection 10 for providing brake pressure pB. Both, the front axle connecting line 216 connecting the brake valve 2 to the front axle brake modulator 210 as well as the rear axle connecting line 218 connecting the brake valve 2 to the rear axle brake modulator 212 are connected to the same working connection 10 of the brake valve 2. In other embodiments, the pneumatic valve 1 could also be formed as a multi circuit pneumatic valve 1 having multiple working connections 10 for providing the same and/or different pressures.

The brake modulators 210, 212 receive the brake pressure pB provided by the brake valve 2 and provide pressurized air at the same brake pressure pB but at a higher volume to the respective brake actuators 206.1, 206.2, 208.1, 208.2. Therefore, the brake modulators 210, 212 are also connected to the compressed air supply via supply lines 220.2, 220.3. It shall be noted that the front axle brake modulator 210 and/or the rear axle brake modulator 212 may also be configured to further modify the brake pressure pB. For example, the front axle brake modulator 210 could comprise ABS-modules (not shown) for providing an ABS-function. Moreover, the brake actuators 206.1, 206.2, 208.1, 208.2 may also be directly connected to the brake valve 1.

For releasing the brake of the vehicle 300, the break pressure pB needs to be released from the brake actuators 206.1, 206.2, 208.1 208.2. The pneumatic valve 1 is therefore configured to exhaust the brake actuators 206.1, 206.2, 208.1 208.2 by connecting the working connection 10 to the exhaust portion 12. In order to exhaust pressurized air, the air needs to be released to the environment through an opening. Such an opening, however, allows water to enter the brake system 200. Brake valves, in particular brake valves having a brake pedal, are usually located in a low position of the vehicle 300. A maximum fording depth of the vehicle 300 is thereby limited, because water could ingress in the brake system 200 via the exhaust portion 12 when the vehicle 300 drives through water and the water level reaches to the exhaust portion. In regular vehicles, the available maximum fording depth is sufficient and pneumatic valves 1 of a standard type may be used as the brake valve 2. If however, when increased fording depths are needed, special measures need to be taken. Therefore, fording versions of pneumatic valves 1, in particular pneumatic brake valves 2, are provided.

In FIG. 1, the brake valve 2 is a fording version, because the pneumatic valve 1 forming the brake valve 2 includes a venting guide 4. The venting guide 4 is connected to an exhaust line 222, which is connected to a remote exhaust silencer 224. For releasing the brakes of the vehicle 300, the brake pressure pB is released from the brake actuators 206.1, 206.2, 208.1 208.2 via the connecting lines 216, 218, the brake valve 2, and its venting guide 4, the exhaust line 222, and the remote exhaust silencer 224.

The venting guide 4 is sealingly connected to an attachment portion 74 of the pneumatic valve 1 and thereby enables a sealing connection between the pneumatic valve 1 and the exhaust line 222. The remote exhaust silencer 224 is spaced apart from the brake valve 1 and placed at a high position on the vehicle 300. By placing the exhaust silencer 224 at a high position of the vehicle 300, ingress of water into the brake system 200 is prevented when the vehicle 300 drives through water. Providing the exhaust silencer 224 remote of the pneumatic valve 1 may be desirable for noise protection in other applications. For example, passengers may be protected from excessive noise by placing the exhaust silencer 224 at a location remote from a passenger cabin, when the commercial vehicle 302 is a bus.

Figure 2:
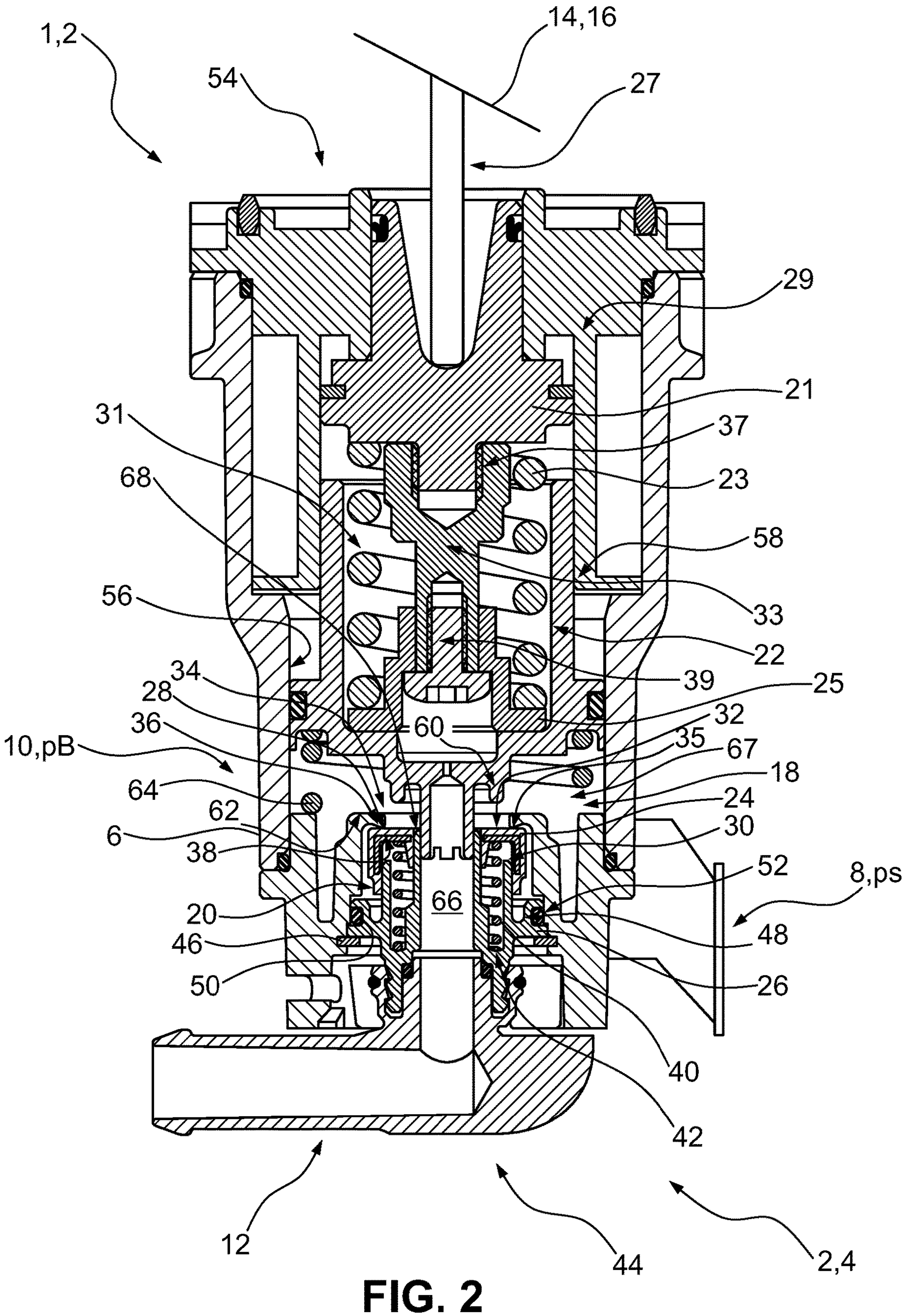
FIG. 2 is a cross-section view of the pneumatic valve.

FIG. 2 shows the pneumatic valve 1 forming the brake valve 2 depicted in FIG. 1 in more detail. The housing 6 defines a first valve cavity 18 and a second valve cavity 20. A piston 22 of the actuation element 14 is slidably arranged in the first valve cavity 18. A valve member 24 and a guide element 26 are arranged in the second valve cavity 20. The valve member 24 is slidably arranged on the guide element 26 such that it is movable between an exhaust position 28 shown in FIG. 2 and a fully open position 30. In the exhaust position 28 a first valve member side 34 of a valve member head 32 of the valve member 24 abuts a first valve seat 35 arranged on a transition 36 between the first valve cavity 18 and the second valve cavity 20. As will be explained in more detail below, movement of valve member 24 is possible due to contact between a piston head 60 and valve member head 32. In the fully open position 30 the piston 22 abuts a hard stop 62 formed by the housing on the transition 36 between the first valve cavity 18 and the second valve cavity 20. The hard stop 62 limits the pistons 22 range of movement such that the valve member 24 reaches the fully open position 30 when the piston 22 contacts the hard stop 62. In the fully open position 30, a second valve member side 38 of the valve member head 32 and the guide element 26 are preferably spaced apart to prevent damages on the valve member 24. A distance between valve member 24 and valve seat 35 reaches its maximum, when the piston 22 reaches the fully open position 30 (i.e. abuts the hard stop 62). Since the stop function is already provided by the hard stop 62, no physical contact is required between the second valve member side 38 and the guide element 26. Thus, the valve member 24 is prevented from damages. The valve member 24 is biased into the exhaust position 28 by a return spring 40 arranged between the second valve member side 34 and a bottom section 42 of the guide element 26.

The guide element 26 is inserted into the second valve cavity 20 from a first housing side 44 and held in place by a lock ring 46. For leak prevention between an outer circumferential face 48 of the guide element 26 and an inner wall 50 of the housing 6 defining the second valve cavity 20, an O-ring 52 is provided between the guide element 26 and the inner wall 50.

The piston 22 is inserted into the first valve cavity 18 from a second housing side 54. Another O-ring 52 is provided between the piston 22 and a second inner wall 56 of the housing 6 defining the first valve cavity 18. The piston 22 sealingly closes off the first valve cavity 18 and is movable between a released position 58 shown in FIG. 2 and a fully actuated position. In the fully actuated position the piston head 60 of the piston 22 abuts the valve member head 32 on the first valve member side 34 and the piston 22 abuts the hard stop 62 formed by the housing on the transition 36 between the first valve cavity 18 and the second valve cavity 20.

The piston 22 is biased towards the released position 58 (in FIG. 2 upwards) by a piston spring 64 such that the piston 22 remains in the released position 58 as long as no force larger than a corresponding force provided by the piston spring 64 is provided to the brake pedal 16. A pressure piece 21, a set spring 23, and a spring seat 25 functionally connect the brake pedal 16 to the piston 22. A push rod 27 of the brake pedal 16 is received in the pressure piece 21, which is in turn slidably received in a cover 29 closing the housing 6 on the second housing side 54. The spring seat 25 is received in a transfer cavity 31 of the piston 22. A connector 33 is screwed on a threaded portion 37 of the pressure piece 21 and extends through the spring seat 25. The cover 29 is fixed to the housing 6 and limits movement of the pressure piece 21 away from the piston 22 (in FIG. 2 upwards). The set spring 23 is arranged between the pressure piece 21 and the spring seat 25 and around the connector 33 for biasing the spring seat 25 away from the pressure piece 21. The connector 33 is slidably received in the spring seat 25. However, a screw head of a screw 39 limits movement of the pressure piece 21 together with connector 33 away from the spring seat 25 such that a maximum distance between the pressure piece 21 and the spring seat 25 is reached when the screw head of the screw 39 abuts the spring seat 25. The set spring 23 between pressure piece 21 and spring seat 25 creates the pneumatic characteristic of the pneumatic valve 1. A maximum stroke of set spring 23 is reached when the pressure piece 21 touches the piston 22. During assembly spring seat 25, pressure piece 21, set spring 23, and connector 33 are assembled together, wherein the screw 39 connects spring seat 25 to connector 33. This preassembly is then assembled in piston 22. Moreover, the piston spring 64 pushes the piston 22 and the spring seat 25 towards the second housing side 54 (upwards in FIG. 2). The screw 39 sets dependent on its position a "0 position" between spring seat 25 and connector 33 attached to pressure piece 21. When the screw 39 is loosened, a space between the pressure piece 21 and the spring seat 25 is increased such that the pre-tension of the set spring 23 is decreased.

Upon actuation of the brake pedal 16, the pressure piece 21 moves towards the first housing side 44 (in FIG. 2 downwards). This movement compresses the set spring 23 and the pressure piece 21 moves towards the spring seat 25. The set spring 23 provides a compression counter force to the spring seat 25 and the piston 22, which in turn moves the piston 22 downwards against the piston spring 64 arranged between the piston 22 and the housing 6. Hence, actuation of the brake pedal 16 leads to compression of the piston spring 64 as well as the set spring 23. An extent by which the pressure piece 21 and the piston 22 move, depends on the compression counter forces (or biasing forces) provided by the set spring 23 and the piston spring 64, since the forces provided by the set spring 23 and the piston spring 64 need to be in equilibrium as long as the pressure piece 21 is spaced apart from the piston 22. Once the set spring 23 has been compressed such that the pressure piece 21 abuts the piston 22, the pressure piece 21 and the piston 22 move in unison. Further actuation of the brake pedal 16 moves the piston 22 towards the fully open position 30 (in FIG. 2 downwards), because a direct connection is established between the brake pedal 16 and the piston 22 via the push rod 27 and the pressure piece 21.

The set spring 23, the spring seat 25, and the screw 39 provide a mechanism for setting a pedal feedback of the brake pedal 16. When the set spring 23 is pre-tensioned to a high degree, the piston 22 is moved at a light actuation of the brake pedal 16, because large forces are required for further compressing the set spring 23. When, on the other hand, pre-tensioning of the set spring 23 is low, the pressure piece 21 performs a free stroke (or empty stroke) towards the piston 22 upon initial actuation of the brake pedal 16, since almost no force is required for compressing the set spring 23. In this case, when the brake pedal 16 is initially moved, only the pressure piece 21 moves towards the piston 22 while the piston 22 itself substantially maintains its position. The valve member 24 substantially maintains its position as well and consequently no brake pressure pB is provided to the working connection 10.

After a potential free stroke of the pressure piece 21, the piston 22 is moved from the released position 58 towards the fully open position (in FIG. 2 down-wards) against the biasing force provided by the piston spring 64. In between the released position 58 and the fully open position, the piston head 60 abuts the valve member 24 whereby a sealing contact is formed between the piston head 60 and the valve member head 32. When the piston 22 is further actuated by the brake pedal 16, it pushes the valve member 24 from the exhaust position 28 towards the fully open position 30. The piston 22 is biased towards the released position 58 by the piston spring 64 arranged between the piston 22 and the housing 6 such that the piston 22 returns to the released position 58 when no actuation force is applied to the brake pedal 16.

The guide element 26 includes an internal channel 66 and a through hole 68 is provided in the valve member head 32 such that the first inner cavity 18 is in fluid communication with the exhaust portion 12 of the brake valve 1, when the piston head 60 is separated from the valve member head 32 (when the piston 22 is in the released position 58). When the actuation element 14 is at least partly actuated, the piston head 60 sealingly contacts the valve member head 32 and thereby separates the exhaust portion 12 from the first valve cavity 18. However, the valve member 24 is then in an at least partially open position wherein the valve member head 32 is separated from the valve seat 35 such that the second valve cavity 20 is in fluid communication with the first valve cavity 18.

The supply connection 8 is in direct fluid communication with the second valve cavity 20 such that pressurized air at the supply pressure pS is provided thereto. When the valve member 24 is in the exhaust position 28 the second valve cavity 20 is closed off from the first valve cavity 18 and the exhaust so that the supply connection 8 is not directly connected to the exhaust. When a brake pressure shall be applied to the working connection 10 while the valve member 24 is in the exhaust position 28, the brake pedal 16 needs to be actuated (pushed downwards with respect to FIG. 2). The piston 22 then moves against the biasing force of the piston spring 64 and abuts the valve member head 32 with its piston head 60. The valve member head 32 is moved out of the exhaust position and a free space is formed between the valve seat 35 and the first valve member side 34 of the valve member head 32. Pressurized air provided to the second valve cavity 20 via the supply connection 8 may then flow from the second valve cavity 20 to the first valve cavity 18. The working connection 10 is in direct fluid communication with the first valve cavity 18 such that pressurized air at the brake pressure pB is supplied to the working connection 10 when the valve member 24 is an at least partially open position. The pressure level of the brake pressure pB depends on the size of the free space formed between the valve seat 35 and the valve member head 32. If the free space is small, a high pressure drop occurs and the brake pressure pB supplied to the working connection 10 is much smaller than the supply pressure pS. When the valve member 24 is in the fully open position 30, a large free space is formed between the valve seat 35 and the valve member head 32 such that the brake pressure pB is substantially equal to the supply pressure pS. In this case, the brake actuators 206.1, 206.2, 208.1, 208.2 connected to the working connection 10 are fully actuated and a maximum braking force is applied.

It shall be noted, that movement of the piston 22 depends on actuation of brake pedal 16 and deflection of set spring 23 as well as additional factors like friction and a force supplied by return spring 64. The set spring 23 deflects, since the brake pressure pB established in the first valve cavity 18 acts on the exposed area of the piston 22 facing towards the first valve cavity 18. As the free space between the valve member head 32 and the valve seat 35 increases, the brake pressure pB also increases. The set spring 23 is deflected (compressed) such that part of a movement of the pressure piece 21 towards the first housing side 44 is compensated by set spring 23. Movement of the piston 22 is therefore not necessarily uniform to a movement of push rod 27 and pressure piece 21. A partial braking characteristic of the brake valve 1 is configurable via set spring 23. When the set spring 23 is fully compressed, the pressure piece 21 contacts piston 22 and a uniform movement of piston 22 and push rod 27 is established. Preferably, contact of piston 22 and pressure piece 21 results in a sudden increase of the free space between the valve seat 35 and valve member head 32 resulting in a jump of the pressure level of the brake pressure pB supplied to the first valve cavity 18 and working connection 10. Further preferred, a pressure level of brake pressure pB substantially equal to the supply pressure pS is established when the pressure piece 21 abuts piston 22.

When the brake pedal 16 is released, the piston 22 and the valve member 24 are returned to the released position 58 and the exhaust position 28 respectively by the springs 40, 64. The valve member head 32 abuts the valve seat 35 and separates the first valve cavity 18 from the second valve cavity 20. Once the valve member 24 has reached the exhaust position 28, further movement of valve member 24 is stopped by the valve seat 35. The piston 22, however, moves on such that the piston head 60 separates from the valve member head 32. The first valve cavity 18 is then once again in fluid communication with the exhaust portion 12 via the through hole 68 and the internal channel 66. Pressurized air at the brake pressure pB may then flow along an exhaust flow path 67 from the working connection 10 to the exhaust portion 12 via the first valve cavity 18, the free space formed between the piston head 60 and the valve member head 32, the through hole 68 and the internal channel 66 formed in the guide element 26.

Figure 3:
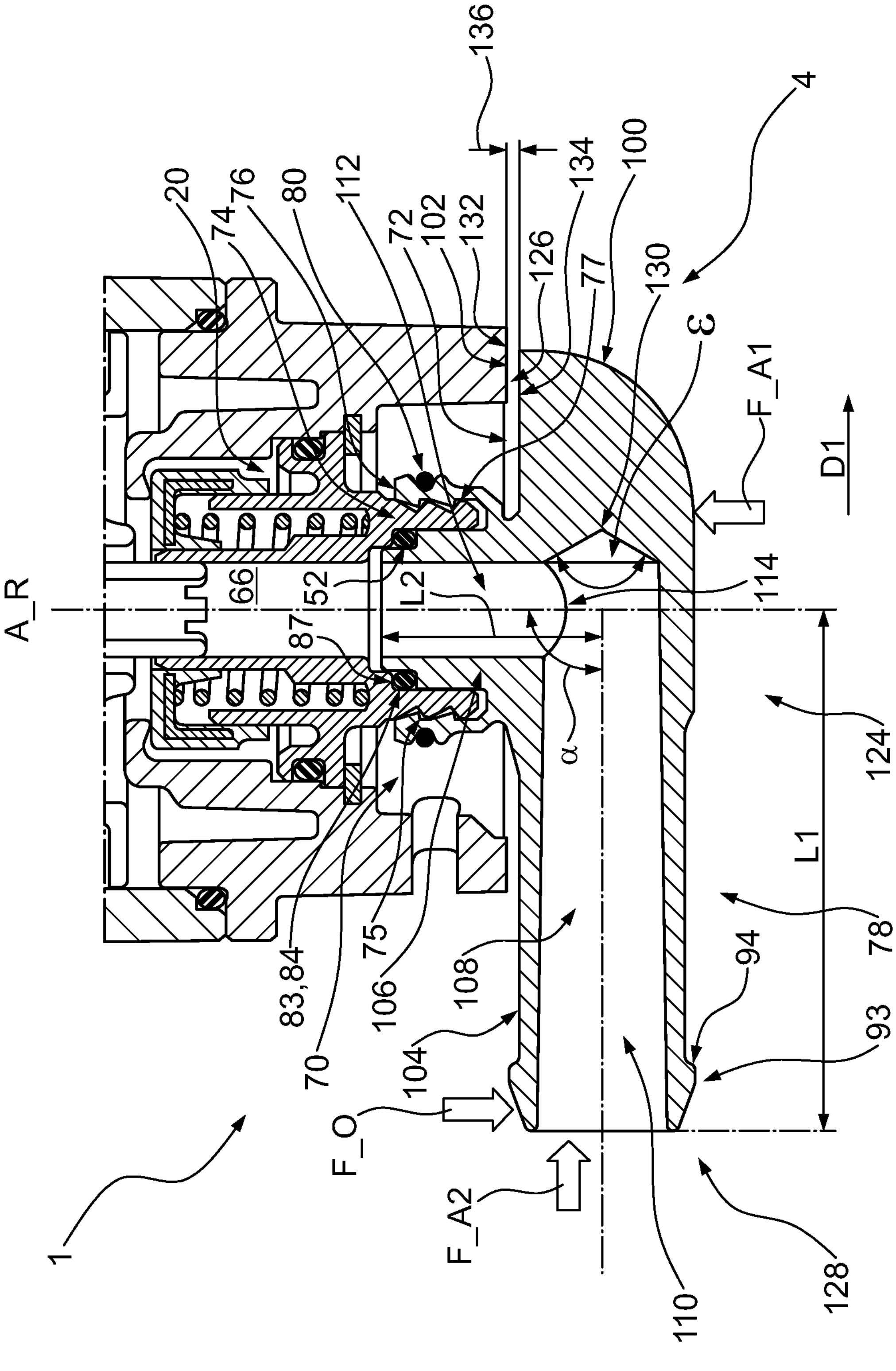
FIG. 3 is an enlarged detail view of FIG. 2.

The exhaust portion 12 is configured for exhausting air from the pneumatic valve 1. While regular pneumatic valves directly exhaust the air to the environment via an exhaust silencer connected to the exhaust portion 12, the exhaust portion 12 of the pneumatic valve 1 shown in FIG. 2 does not directly exhaust the pressurized air to the environment. Instead, the pressurized air is provided to the venting guide 4. The exhaust portion 12 and the venting guide 4 are further described with relation to FIG. 3 showing a detail of the pneumatic valve 1 depicted in FIG. 2.

The exhaust portion 12 includes an exhaust cavity 70 formed by the housing 6. The exhaust cavity 70 is arranged between the second valve cavity 20 and an outer opening 72 of the housing 6. The internal channel 66 opens into the exhaust cavity 70. If the venting guide 4 were not part of the pneumatic valve 1, the outer opening 72 would form an opening of the pneumatic valve 1 to the environment. However, as shown in FIG. 3, the venting guide 4 is connected to the guide element 26 of the pneumatic valve 1. An attachment portion 74 having connection elements 75 is provided on the guide element 26 at an end portion of the internal channel 66. In this embodiment, the connection elements 75 are formed as circumferential saw tooth shaped ridges, which are engaged by complementary connection elements 76 of the venting guide 4 formed as snap hooks 77.

The pneumatic valve 1 includes a valve sealing surface 83, which is formed on the guide element 26 in the depicted embodiment. In particular, the valve sealing surface 83 is an inner sealing face 84 formed on the internal channel 66. To ensure the sealing connection between the venting guide 4 and the attachment portion 74, a sealing element in the form of an O-ring 52 is arranged between the venting guide 4 and the sealing surface 83. In this embodiment, the first sealing face 85 is formed by a step 87 of the internal channel 66. When the complementary connection elements 76 engage the connection elements 75 of the attachment portion 74, the venting guide 4 presses the O-ring 52 against the step 87 and thereby ensures a sealing connection of the venting guide 4 to the guide element 26.

The venting guide 4 comprises a spout 78 and a support projection 100. It partially extends out of the exhaust cavity 70 and away from the pneumatic valve 1. The spout 78 is L-shaped. A first leg 104 of the spout 78 is adapted to be inserted in a hose (not shown) which can be clamped onto the spout 78 with a hose clamp (not shown). A spout end 93 on the first leg 104 comprises a circumferential ridge 94 preventing a hose clamp from sliding of the spout 78. A first leg length L1 of the first leg 104 is greater than a corresponding second leg length L2 of the second leg 106.

For guiding the pressurized air received from the exhaust portion 12 of the pneumatic valve 1, the venting guide 4 includes a venting channel 108. A first venting channel portion 110 of the venting channel 108 extends in the first leg 104 while a second venting channel portion 112 intersecting the first venting channel portion 110 at an intersection 114 extends in the second leg 106 of the L-shaped spout 78. In the shown embodiment and preferably the L-shape is bent in a single plane. A central axis of the first venting channel portion 110 and a central axis of the second venting channel portion 112 lie in a common plane.

In the embodiment shown in FIG. 3, the first venting channel portion 110 intersects the second venting channel portion 112 at a 90° leg angle α such that the venting channel portions 110, 112 of the venting channel 108 extend perpendicular to each other from the intersection 114. The venting channel portions 110, 112 are formed as cylindrical bores in the spout 78. One or both venting channel portions 110, 112 may also have a non-cylindrical shape. For example the first venting channel portion 110 and/or the second venting channel portion 112 may have a rectangular, octagonal, and/or oval cross-section.

A tapered end portion 130 of the first venting channel portion 110 extends beyond the intersection 114. In this embodiment, only the tapered end portion 130 extends beyond intersection 114. However, part of the first venting channel portion 110 may preferably extend beyond the intersection 114 as well. The tapered end portion 130 has a conical shape, in particular a circle cone shape. An opening angle ε of the tapered end portion 130 has a value of 120°. The tapered end portion 130 is preferably formed by the tip of a drill bit, when the first venting channel portion 110 is drilled during manufacturing of the venting guide 4. Manufacturing of the venting channel 108 is facilitated since no flat-bottomed hole needs to be provided for forming the first venting channel portion 110.

Moreover, the tapered end portion 130 improves stability of the pneumatic valve 1. During operation, pressurized air is discharged from the pneumatic valve 1 via the venting channel 108 of the venting guide 4. Air flows from the internal channel 66 of the guide element 26 to the second venting channel portion 112. At the intersection 114, the air flow is redirected into the first venting channel portion 110 and towards the spout end 93. A momentum of the airflow changes and the air exerts forces on the venting guide 4 at the intersection 114. Moreover, a pressure drop occurs between the environment and the pneumatic valve 1 such that a pressure level in the venting channel 108 differs from a pressure level of the environment. This pressure differential also exerts forces on the venting guide 4. The tapered end portion 130 evenly distributes the forces resulting from the pressure differential and from the momentum change of the airflow, such that non-symmetrical loads on the venting guide 4 are substantially limited. Thereby less stress is put on the complementary connection elements 76 of the venting guide 4 as well as the attachment portion 4.

FIG. 3 depicts the venting guide 4 in a neutral position 128. The first leg 104 of the L-shaped spout 78 laterally extends from the housing 6. No external loads are provided on the spout 78 in the neutral position 128. However, during assembly and or operation, loads are provided on the venting guide 4, in particular on the spout 78. During assembly, the venting guide 4 is pushed onto the guide element 26 such that the complementary connection elements 76 engage the attachment portion 4. For engaging the connection elements 75 of the attachment portion 4, the snap hooks 77 are pushed over the ridges of the attachment portion 4 (upwards with respect to FIG. 3). While being pushed over the ridges of the attachment portion 4, the snap hooks 77 are laterally deformed (horizontally with respect to FIG. 3). For pushing the venting guide 4 onto the attachment portion 74, a first assembly force F_A1 is provided onto the venting guide 4. The first assembly force F_A1 required for pushing the complementary connection elements 76 onto the attachment portion 74 is further increased by an annular spring 80, biasing the snap hooks 77 inwards. A person assembling the pneumatic valve 1 or an assembly apparatus may provide the first assembly force F_A1 unevenly to the venting guide 4, such that the venting guide 4 tilts relative to the guide element 26 (e.g. counter-clockwise with respect to FIG. 3). Moreover, a hose or pipe (not shown in FIG. 3) is pushed over the spout end 93 of spout 78 when the pneumatic valve 1 is installed in the vehicle 300. This exerts a second assembly force F_A2 on the spout 78. Due to the L-shape of the spout 78, a tilting momentum results from the second assembly force F_A2. Moreover, during operation the hose or pipe may exert additional forces on the first leg 104 of the spout 78. An exemplary operational force F_O is illustrated in FIG. 3.

If those forces F_A1, F_A2, F_0 were not compensated as explained below, the venting guide 4 would excessively tilt relative to the attachment portion 74 which could lead to damages on the complementary connection elements 76 and/or the connection elements 75. Moreover, a sealing connection between the venting guide 4 and the guide element 26 would not be ensured.

To prevent tilting of the venting guide 4 relative to the housing 6, the venting guide 4 comprises a support projection 100. The support projection 100 extends opposite the first leg 104 from a main venting guide body 124 of the venting guide 4. The second leg 106 and the complementary connection elements 76 are located between the first leg 104 and the support projection 100 in a first direction D1. A central axis of the support projection 100 is substantially parallel to a central axis of the first leg 104, which is particularly conceivable from FIG. 4. In this embodiment, the support projection 100 and the first leg 104 of the spout 4 have a common central axis A_C. In the top view of FIG. 4, the venting guide 4 is symmetrical with respect to this central axis A_C. The top view furthers shows, that the venting guide 4 comprises a total of ten snap hooks 77. However, the venting guide may also comprise less than ten snap hooks 77, preferably two, three, four, five, six, seven, eight, or nine, or more than ten snap hooks 77, preferably eleven, twelve, thirteen, fourteen or fifteen.

In the embodiment shown in FIG. 3, the support projection 100 has the shape of a shark fin. The shark fin shape facilitates assembly, since no sharp edges are projecting towards a person pushing the venting guide 4 onto the guide element 26. The support projection 100 may also have any other shape. Preferably, the support projection 100 may have a rectangular cross-section in a side view (as shown in FIG. 3). The support projection 100 is positioned adjacent to a contact region 102 of the housing 6. The contact region 102 is preferably formed on the housing 6. However, the contact region 102 may also be formed on other elements of the pneumatic valve 1, for example on an adapter 120 described later with respect to FIG. 7. The contact region 102 is provided on the housing 6 on the first housing side 44. Since, the exhaust cavity 70 opens towards the first housing side 44, the contact region 102 is adjacent to the exhaust cavity 70. In this embodiment, a flat first contact surface 132 of the housing 6 forms the contact region 102. A corresponding flat support surface 134 is arranged opposite the first contact surface 132 on the support projection 100.

A gap 126 is formed between the first contact surface 132 of the contact region 102 and the support surface 134 of the support projection 100 when the venting guide 4 is in the neutral position 128. The gap 126 reduces overall cost of the pneumatic valve 1, since the venting guide 4 and the housing 6 can be machined with less precision. A gap width 136 of the gap 126 is small. If the venting guide 4 is tilted during assembly and/or operation due to forces F_A1, F_A2, F_O, the venting guide 4 slightly tilts with respect to the housing 6. The gap 126 is thereby closed (the gap width 136 reduced to zero respectively), such that the support projection 100 abuts the contact region 102. The support surface 134 of the support projection 100 then contacts the first contact surface 132 of the contact region 102. Tilting forces provided on the venting guide 4 are transferred to the housing 6 such that excessive tilting of the venting guide 4 relative to the housing 6 is prevented. It shall be understood, that the support projection 100 allows a slight tilt of the venting guide 4 relative to the housing 6 in the shown embodiment. However, the gap width 136 may be chosen such that the relative tilt of the venting guide 4 relative to the housing 6 does not inhibit a sealing connection and that neither the complementary connection elements 76 nor the connection elements 75 are damaged. In other embodiments, the support projection 100 may abut the contact region 102 in the neutral position 128.

Figure 4:
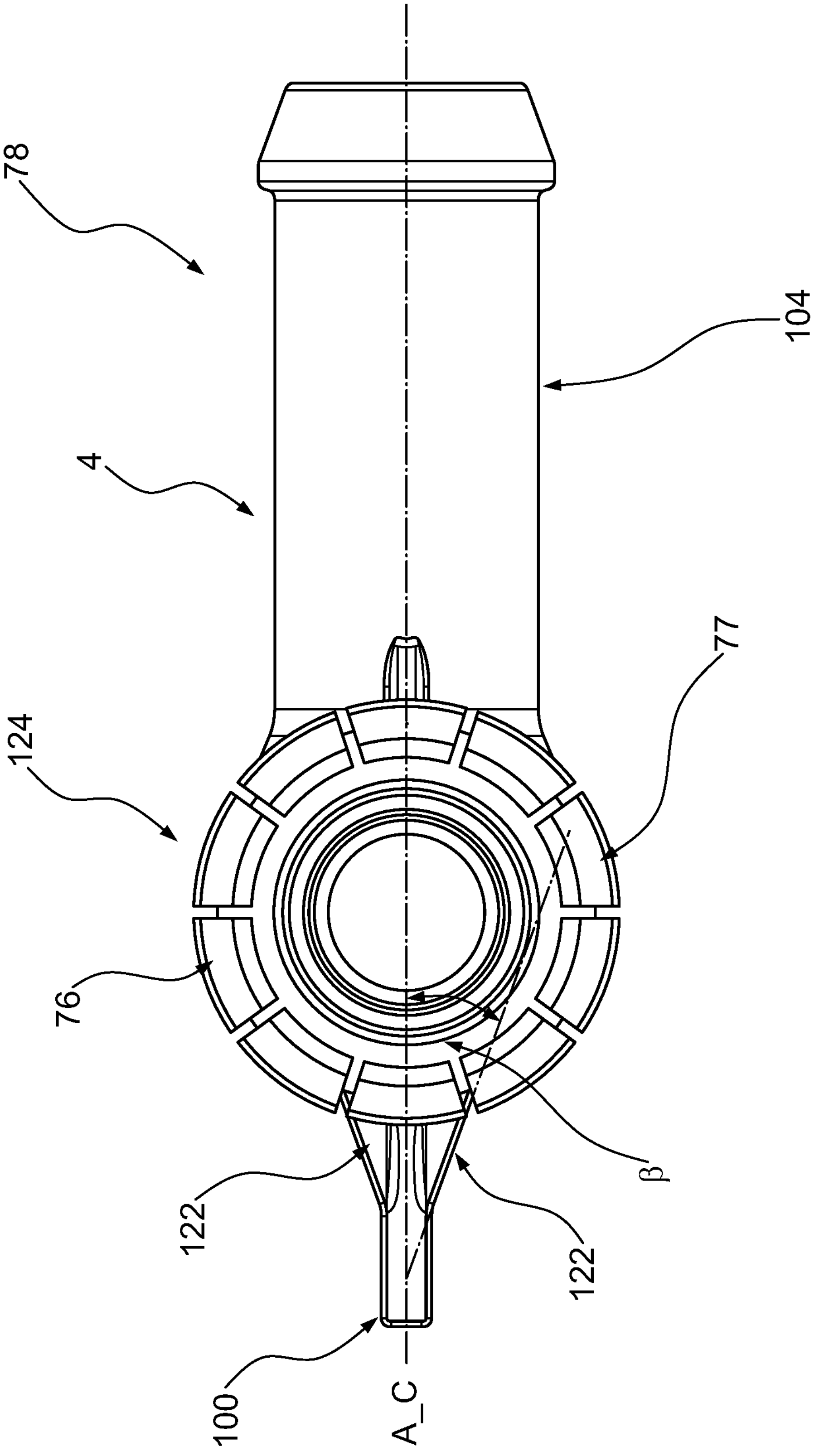
FIG. 4 is a top view of a venting guide of the pneumatic valve of FIG. 2.
Figure 5:
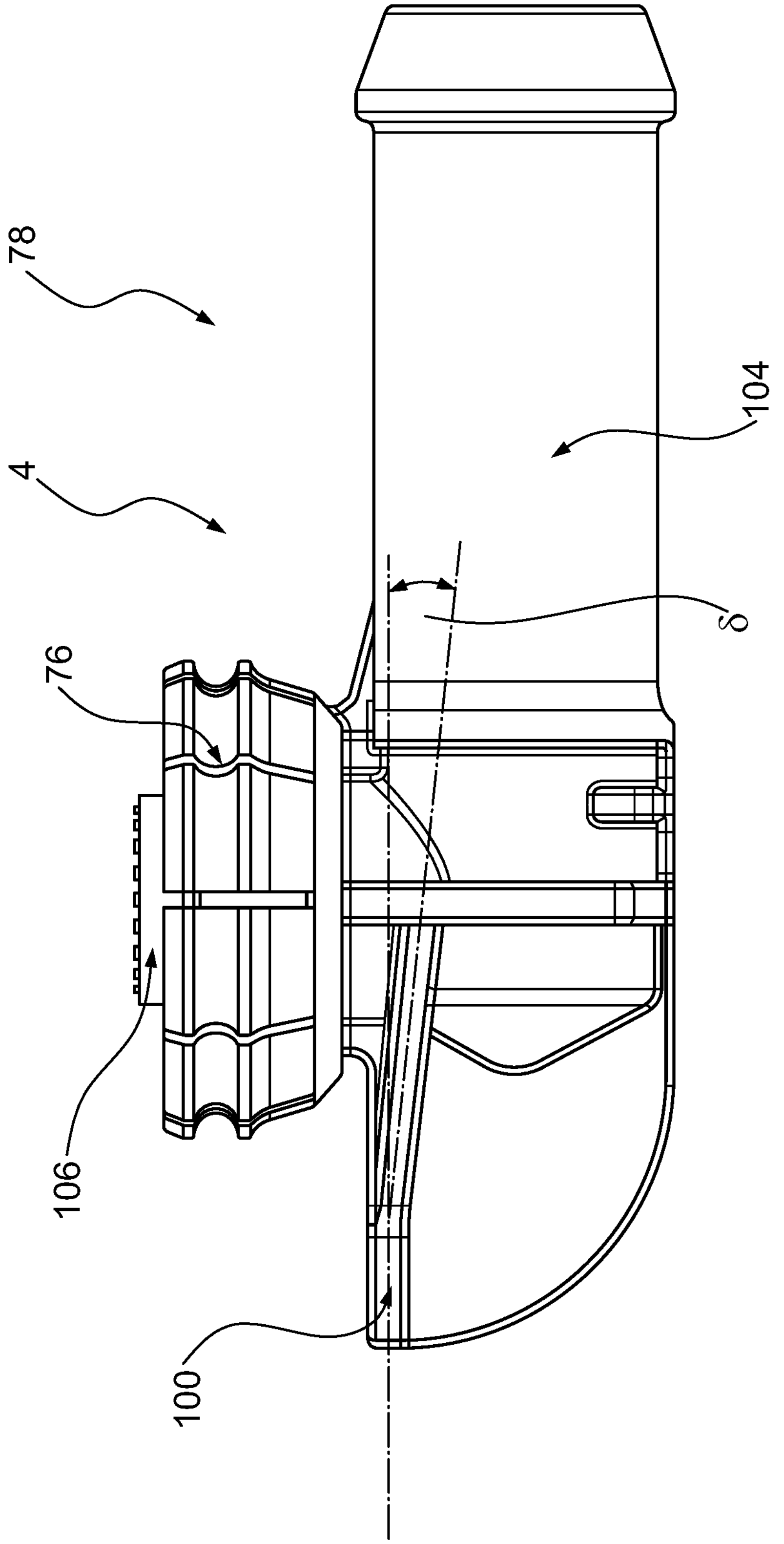
FIG. 5 is a side view of the venting guide of FIG. 4.

The venting guide 4 further comprises reinforcement ribs 122 shown in FIG. 4. The reinforcement ribs 122 extend from the support projection 100 at a rib angle β of 20°. The ribs 122 prevent buckling and/or bending of the support projection 100. The rib angel β is measured in a plane perpendicular to the second venting channel portion 112. In a symmetry plane of the venting channel 108 (the plane shown in FIG. 5), the ribs 122 are inclined at a secondary rib angle δ of about 10°. The ribs 122 support the support projection 100. The support projection 100 may therefore be formed as a thin rib and less material is required for manufacturing the support projection 100. Preferably, the venting guide 4 is made from a plastic material, particularly preferred by injection molding. A preferred material of the venting guide 4 is Polyamid 6 (PA6 or Polycaprolactam). The support projection 100 and the ribs 122 are relatively thin, so that imperfections resulting from different solidifications rates during molding are prevented.

Figure 6:
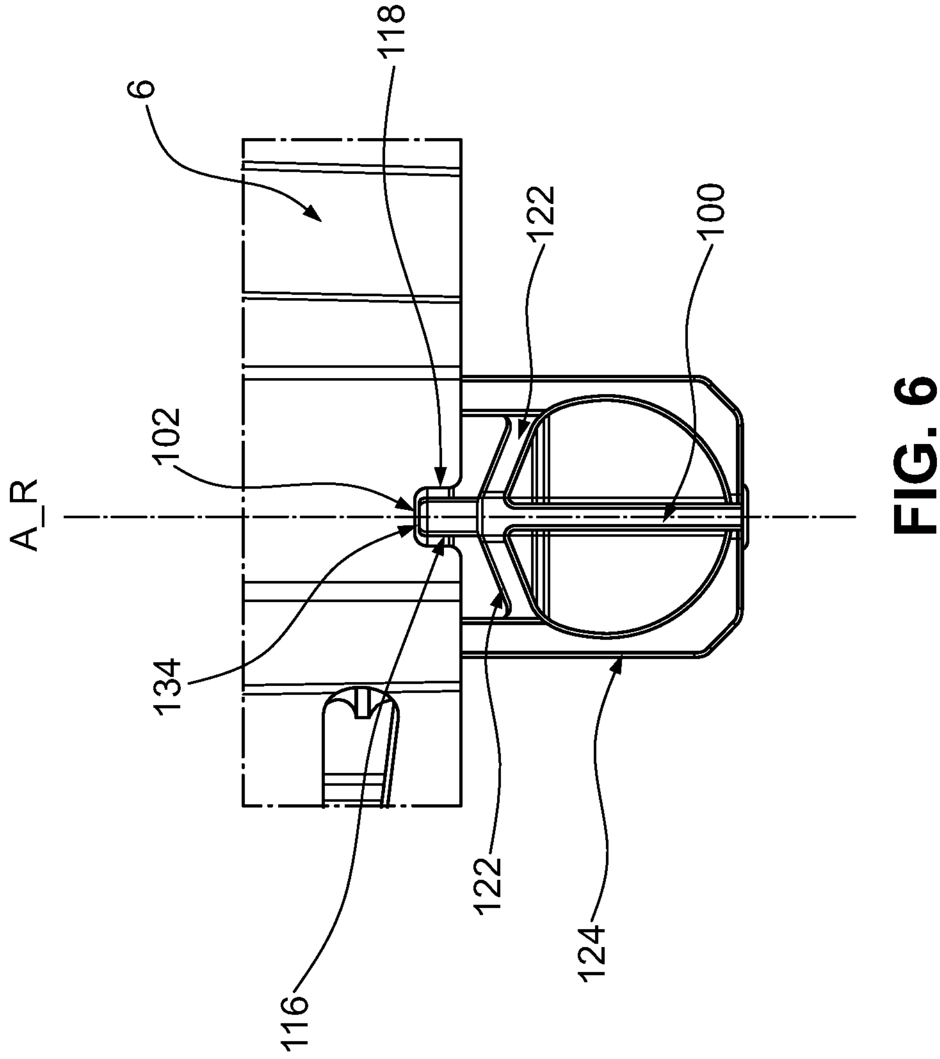
FIG. 6 is a detail view of a pneumatic valve according to a second embodiment.
Figure 7:
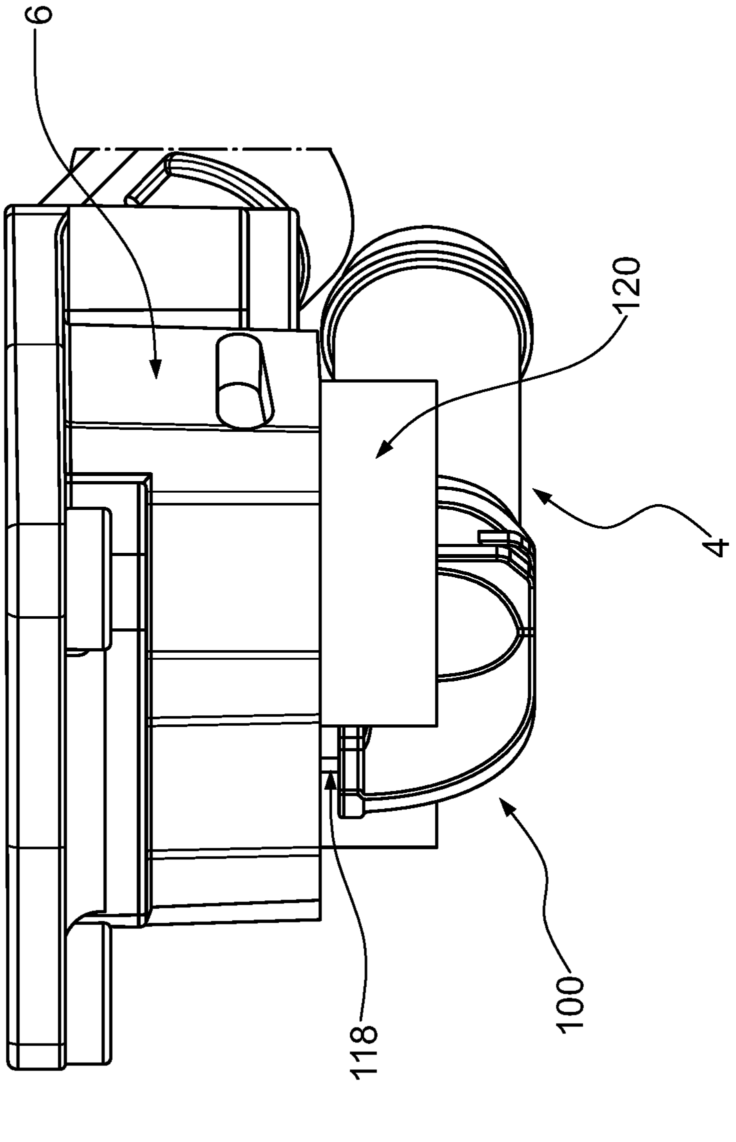
FIG. 7 is a detail view of a pneumatic valve according to a third embodiment.

The ribs 122 are particularly helpful to prevent bending and or buckling of the support projection 100 if the venting guide 4 comprises an anti-rotation feature as shown in the alternative embodiment depicted in FIG. 7 showing only part of the housing 6. The support projection 100 further comprises a protrusion 116 extending towards the contact region 102. The support surface 134 of the support projection 100 is formed on the protrusion 116. However, the support surface 134 may also be formed separate from the protrusion 116. The protrusion 116 engages a slot 118 such that rotation of the venting guide 4 relative to the housing 6 of the pneumatic valve 1 around a rotational axis A_R is substantially limited or prevented. A rotation force provided to the venting guide 4 is transferred to the housing 6 via the protrusion 116. The ribs 122 help transferring such a rotational load. However, it shall be noted that a venting guide 4 comprising an anti-rotation feature may also be formed without ribs 122. In the embodiment shown in FIG. 6, the slot 118 receiving the protrusion 116 is formed in the housing 6. The rotational axis A_R preferably extends centrally through the complementary connection elements 76 and/or the second venting channel portion 112. Together the protrusion 116 and the slot 118 prevent rotation of the venting guide 4. The slot may be easily machined into the housing 6 of the pneumatic valve 1. This provides a simple way to ensure a specific orientation of the first leg 104 of the spout 78 relative to the housing 6.

However, providing the slot 118 in the housing 6 may not be practical in all cases. Preferably, the slot 118 may therefore be formed in an adapter 120 as shown in FIG. 7. The adapter 120 is rotationally fixed to the housing 6. For example, the adapter 120 may be glued and or screwed to the housing 6. In the alternative embodiment shown in FIG. 6, the support projection 100 engages the slot 118 such that no protrusion 116 is required or the support projection 100 in itself forms the protrusion 116 respectively. Preferably, also embodiments of the pneumatic valve 1 having an adapter 120 may include a protrusion 116 of the venting guide 4 extending form the support projection 100 into slot 118. The adapter 120 may be formed from a plastic material. The functionality of the embodiments shown in FIGS. 6 and 7 with regard to the anti-rotation feature are substantially the same. Rotational loads provided on the venting guide 4 are transferred to the housing 6 via the slot 118 such that the slot 118 inhibits rotation of the venting guide 4 around rotational axis A_R. The adapter 120 may be provided for different orientations of the first leg 104 of the spout 78 with respect to the housing 6. Through this, the pneumatic valve 1 may be easily adapted to different vehicles or use cases.

Figure 8:
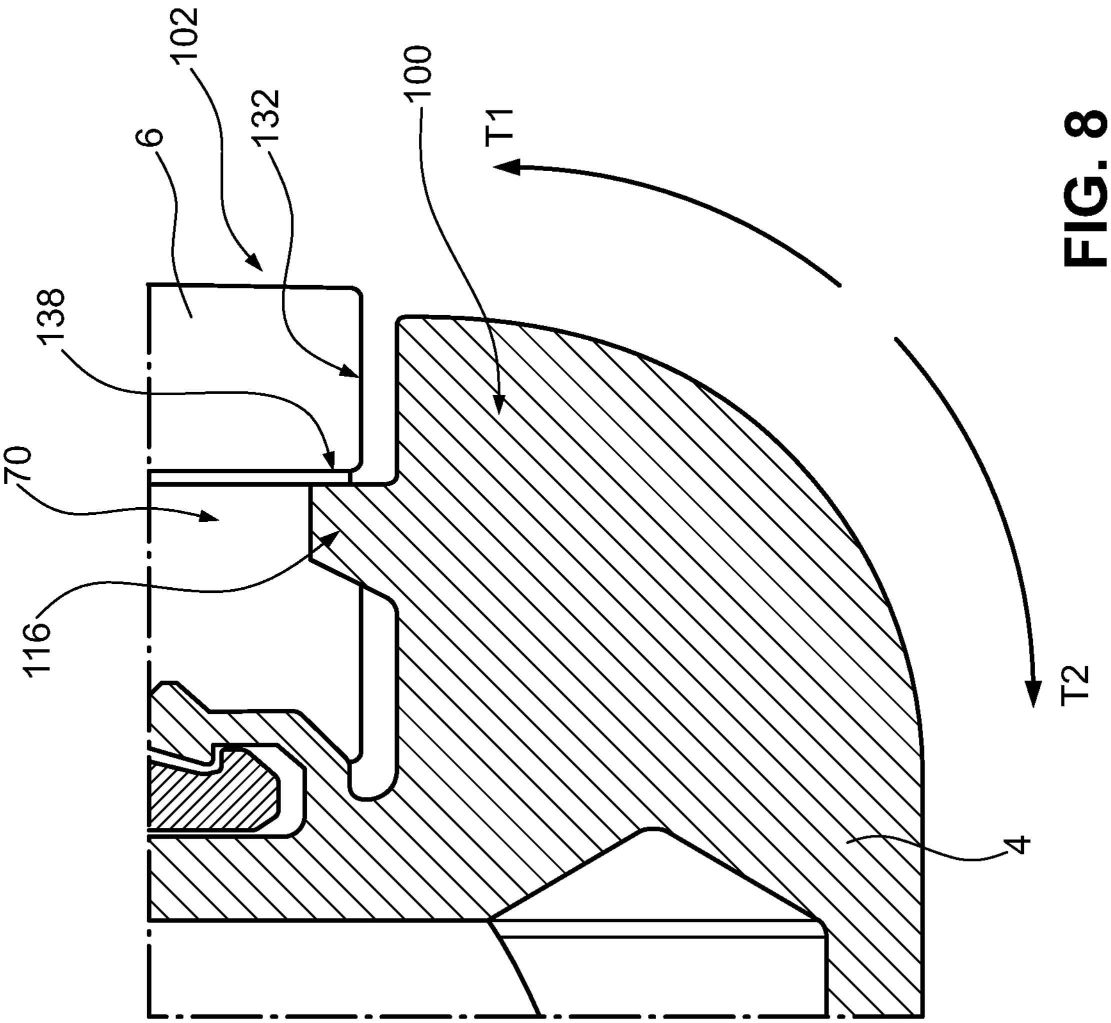
FIG. 8 is a detail view of a pneumatic valve according to a fourth embodiment.

FIG. 8 shows a detail of another embodiment of the pneumatic valve 1. In this embodiment, the protrusion 116 does not engage a slot 118. Instead, the protrusion 116 extends inside the exhaust cavity 70 formed by the housing 6. The support projection 100 is positioned adjacent to a second contact surface 138 of the contact region 102 that is perpendicular to the first contact surface 132. In the shown embodiment, the second contact surface 138 is an inner circumferential surface of the housing 6. Similar to the previously discussed embodiments, the support surface 134 of the support projection 100 is again positioned adjacent to the first contact surface 132 of the contact region 102. To prevent tilting of the venting guide 4 in a first tilt direction T1, which is a counter-clockwise direction in FIG. 8, the support surface 134 of the support projection 100 may abut the first contact surface 132 of the contact region 102. To prevent tilting of the venting guide 4 relative to the housing 6 in a second tilt direction T2, which is a clockwise direction in FIG. 8, the protrusion 116 may abut the second contact surface 138. Together, the support projection 100 and the protrusion 116 thus prevent clockwise as well as counter-clockwise rotation of the venting guide 4 relative to the housing 6.

LIST OF REFERENCE SIGNS (PART OF THE DESCRIPTION)

1 pneumatic valve
2 brake valve
6 housing
8 supply connection
10 working connection
12 exhaust portion
14 actuation element
16 brake pedal

18 first valve cavity
20 second valve cavity
21 pressure piece
22 piston
23 set spring
24 valve member
25 spring seat
26 guide element
27 push rod
28 exhaust position
29 cover
30 fully open position
32 valve member head
33 connector
34 first valve member side
35 valve seat
36 transition
37 threaded portion
38 second valve member side
39 screw
40 return spring
42 bottom section
44 first housing side
46 lock ring
48 outer circumferential face
50 inner wall
52 O-ring
54 second housing side
56 second inner wall
58 released position
60 piston head
62 hard stop
64 piston spring
66 internal channel
67 exhaust flow path
68 through hole
70 exhaust cavity
74 attachment portion
75 connection elements
76 complementary connection elements
77 snap hooks
78 spout
80 annular spring
83 valve sealing surface
84 inner sealing face
87 step
93 spout end
94 ridge
100 support projection
102 contact region
104 first leg
106 second leg
108 venting channel
110 first venting channel portion
112 second venting channel portion
114 intersection
116 protrusion
118 slot
120 adapter
122 reinforcement ribs
124 main venting guide body
126 gap
128 neutral position
130 tapered end portion
132 first contact surface
134 support surface
136 gap width

138 second contact surface
200 brake system
202 front axle brake circuit
204 rear axle brake circuit
206.1, 206.2 front axle brake actuators
208.1, 208.2 rear axle brake actuators
210 front axle brake modulator
212 rear axle brake modulator
214 compressed air supply
216 front axle connecting line
218 rear axle connecting line
220.1, 220.2, supply lines
202.3
222 exhaust line
224 remote exhaust silencer
300 vehicle
302 commercial vehicle
304 front axle
306 rear axle
308.1, 308.2 front wheels
310.1, 310.2 rear wheels
A_C central axis
A_R rotational Axis
D1 first direction
F_A1 first assembly force
F_A2 second assembly force
F_O operational force
L1 first leg length
L2 second leg length
pB working pressure; brake pressure
pS supply pressure
T1 first tilt direction
T2 second tilt direction
α leg angle
β rib angle
δ secondary rib angle
ε opening angle

What is claimed is:

1. A pneumatic valve (1) for providing a working pressure (pB), comprising a housing (6) having a first housing side (44);

a supply connection (8) for receiving a supply pressure (pS);

a working connection (10) for providing the working pressure (pB);

an exhaust portion (12), for discharging pressurized air from the pneumatic valve (1), located proximate to the first housing side (44), an attachment portion (74);

a valve member (24) continuously slidable from an exhaust position (28) to a fully open position (30), wherein the working connection (10) is in fluid communication with the exhaust portion (12) when the valve member (24) is in the exhaust position (28), and wherein the working connection (10) is in fluid communication with the supply connection (8) and sealed from the exhaust portion (12) when the valve member (24) is in an at least partially open position, and a venting guide (4), the venting guide (4) comprising a venting channel (108) and complementary connection elements (76) engaging the attachment portion (74)

the venting guide (4) comprising a spout (78) and a support projection (100), wherein the support projection (100) is positioned adjacent to a contact region (102) of the housing (6) provided on the first housing side (44) and configured to abut the contact region (102) to block tilting of the venting guide (4) relative to the housing (6);

wherein the contact region (102) is a bottom outer surface of the housing (6) on the first housing side.

2. The pneumatic valve (1) according to claim 1, wherein the spout (78) is an essentially L-shaped spout (78) having a first leg (104) and a second leg (106).

3. The pneumatic valve (1) according to claim 2, wherein the support projection (100) extends opposite the first leg (104) of the L-shaped spout (78).

4. The pneumatic valve (1) according to claim 2, wherein the venting guide (4) comprises a venting channel (108) having a first venting channel portion (110) extending in the first leg (104) and a second venting channel portion (112) extending in the second leg (106) of the L-shaped spout (78), wherein a tapered end portion (130) of the first venting channel portion (110) extends beyond an intersection (114) between the first venting channel portion (110) and the second venting channel portion (112).

5. The pneumatic valve (1) according to any of claim 1, wherein the attachment portion (74) and the complementary connection elements (76) allow rotation of the venting guide (4) around a rotational axis (A_R) when engaged with each other.

6. The pneumatic valve (1) according to claim 1, wherein a protrusion (116) of the venting guide (4) extends from the support projection (100) towards the contact region (102), wherein the contact region (102) of the housing comprises a first contact surface (132) and a second contact surface (138) transverse to the first contact surface (132), wherein the support projection (100) is positioned adjacent to the first contact surface (132) and configured to abut the first contact surface (132) to block tilting of the venting guide (4) relative to the housing (6) in a first tilt direction (T1), and wherein the protrusion (116) is positioned adjacent to the second contact surface (138) and configured to abut the second contact surface (138) to prevent tilting of the venting guide (4) relative to the housing (6) in a second tilt direction (T2) opposite the first tilt direction (T1).

7. The pneumatic valve (1) according to claim 1, further comprising a guide element (26), wherein the valve member (24) is slidably arranged on the guide element (26), the guide element (26) comprising an internal channel (66), wherein the internal channel (66) forms part of an exhaust flow path (67) between the working connection (10) and the exhaust portion (12) when the valve member (24) is in the exhaust position (12).

8. The pneumatic valve (1) according to claim 7, wherein the venting guide (4) is formed separately from the guide element (26) and wherein the attachment portion (74) is formed on the guide element (26).

9. The pneumatic valve (1) according to claim 8, further comprising a valve sealing member provided at a transition between the internal channel (66) and the venting channel (108) for establishing a sealing connection between the venting guide (4) and the guide element (26).

10. The pneumatic valve (1) according to claim 1, wherein the venting guide (4) comprises one or more reinforcement ribs (122) extending from the support projection (100) towards a main venting guide body (124) of the venting guide (4).

11. The pneumatic valve (1) according to claim 1, wherein a gap (126) is formed between the contact region (102) and the support projection (100) when the venting guide (4) is in a neutral position (128);

wherein the valve member (24) slides in an axial direction, wherein the gap defines an open space axially between the contact region (102) and an upper surface of the support projection (100).

12. The pneumatic valve (1) according to claim 1, wherein the contact region (102) forms an end stop for the venting guide (4) limiting excessive loads on the attachment portion (74) when the venting guide (4) is assembled on the attachment portion (74).

13. A vehicle (300) comprising a brake system (200) comprising a pneumatic valve (1) according to claim 1.

14. A pneumatic valve (1) for providing a working pressure (pB), comprising a housing (6) having a first housing side (44);

a supply connection (8) for receiving a supply pressure (pS);

a working connection (10) for providing the working pressure (pB);

an exhaust portion (12), for discharging pressurized air from the pneumatic valve (1), located proximate to the first housing side (44), an attachment portion (74);

a valve member (24) continuously slidable from an exhaust position (28) to a fully open position (30), wherein the working connection (10) is in fluid communication with the exhaust portion (12) when the valve member (24) is in the exhaust position (28), and wherein the working connection (10) is in fluid communication with the supply connection (8) and sealed from the exhaust portion (12) when the valve member (24) is in an at least partially open position, and a venting guide (4), the venting guide (4) comprising a venting channel (108) and complementary connection elements (76) engaging the attachment portion (74) the venting guide (4) comprising a spout (78) and a support projection (100), wherein the support projection (100) is positioned adjacent to a contact region (102) of the housing (6) provided on the first housing side (44) and configured to abut the contact region (102) to block tilting of the venting guide (4) relative to the housing (6);

wherein the venting guide (4) engages a corresponding slot (118) to block rotation of the venting guide (4) around the rotational axis (A_R), wherein the slot (118) is formed in the housing (6) and/or in an adapter (120) connected to the housing (6).

15. The pneumatic valve (1) according to claim 14, wherein a protrusion (116) of the venting guide (4) extends from the support projection (100) towards the contact region (102).

16. The pneumatic valve (1) according to claim 15, wherein the protrusion (116) of the venting guide (4) engages the slot (118).

17. The pneumatic valve (1) according to claim 14, wherein the slot is formed in the housing (6).

18. The pneumatic valve (1) according to claim 14, wherein the slot is formed in the adapter (120) connected to the housing (6).

19. The pneumatic valve (1) according to claim 18, wherein the adapter (120) is rotationally fixed relative to the housing (6).

20. A pneumatic valve (1) for providing a working pressure (pB), comprising a housing (6) having a first housing side (44);

a supply connection (8) for receiving a supply pressure (pS);

a working connection (10) for providing the working pressure (pB);

an exhaust portion (12), for discharging pressurized air from the pneumatic valve (1), located proximate to the first housing side (44), an attachment portion (74);

a valve member (24) continuously slidable from an exhaust position (28) to a fully open position (30), wherein the working connection (10) is in fluid communication with the exhaust portion (12) when the valve member (24) is in the exhaust position (28), and wherein the working connection (10) is in fluid communication with the supply connection (8) and sealed from the exhaust portion (12) when the valve member (24) is in an at least partially open position, and a venting guide (4), the venting guide (4) comprising a venting channel (108) and complementary connection elements (76) engaging the attachment portion (74) the venting guide (4) comprising a spout (78) and a support projection (100), wherein the support projection (100) is positioned adjacent to a contact region (102) of the housing (6) provided on the first housing side (44) and configured to abut the contact region (102) to block tilting of the venting quide (4) relative to the housing (6);

wherein the venting guide (4) is snap fitted to the attachment portion (74).

* * * * *